J. A. BERELS AND R. T. CRIST.
PISTON RING.
APPLICATION FILED APR. 28, 1919.
1,399,841. Patented Dec. 13, 1921.
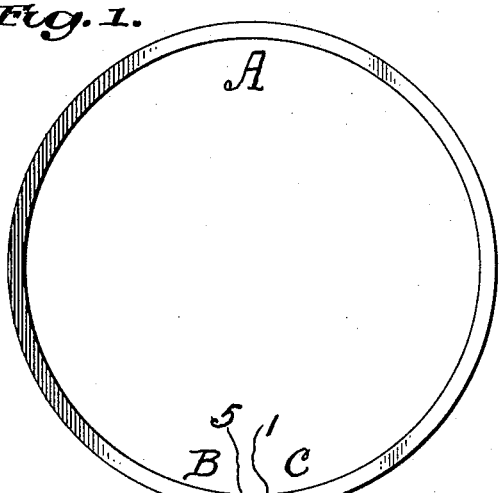
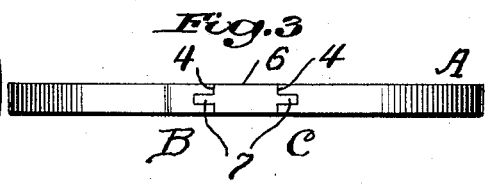
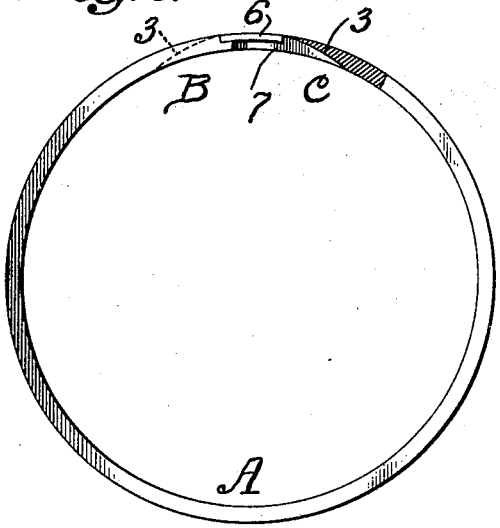
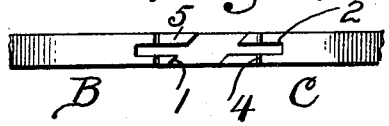
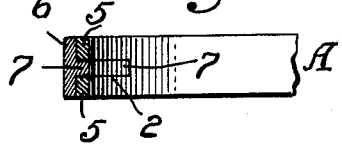
INVENTORS
Joseph A. Berels & Raymond T. Crist,
BY
ATTORNEYS

UNITED STATES PATENT OFFICE.

JOSEPH A. BERELS AND RAYMOND T. CRIST, OF DETROIT, MICHIGAN.

PISTON-RING.

1,399,841.  Specification of Letters Patent.  Patented Dec. 13, 1921.

Application filed April 28, 1919. Serial No. 293,232.

*To all whom it may concern:*

Be it known that we, JOSEPH A. BERELS and RAYMOND T. CRIST, citizens of the United States of America, residing at Detroit, in the county of Wayne and State of Michigan, have invented certain new and useful Improvements in Piston-Rings, of which the following is a specification, reference being had therein to the accompanying drawings.

Our invention relates to that class of piston rings that are split so that the ring may be contracted or distended, and between the split ends of which there is interposed a self adjusting connecting member.

The object of our invention is to provide a piston ring of the above class wherein the interposed connecting member is of novel construction so that there will be a non-leakable connection between the split ends of the ring and the wall of the cylinder; a connection which will compensate for wear and distension of the ring, and a mechanical construction that is simple, durable, inexpensive to manufacture, and highly efficient for the purposes for which it is intended.

The above and other objects are attained by a mechanical construction that will be hereinafter specifically described and then claimed, and reference will now be had to the drawings, wherein Figure 1 is a side elevation of the piston ring in a contracted condition;

Fig. 2 is a similar view of the same, partly broken away and partly in section;

Fig. 3 is a plan of the piston ring, showing a joint at the split ends of the piston ring;

Fig. 4 is a horizontal sectional view showing the inner wall of the piston ring at the joint of the split ends thereof;

Fig. 5 is a plan of a portion of the piston ring with the connecting member removed;

Fig. 6 is an enlarged cross sectional view of a portion of the piston ring at the joint thereof, and Fig. 7 is a perspective view of a detached connecting member.

In the drawing, the reference character A denotes a ring which is split or cut to provide ends B and C, the ring being cut or divided on a bias so that the ends B and C will have angularly disposed confronting edges 1.

The split ends B and C of the ring A are longitudinally slotted, as at 2, and the inner or closed end of each slot presents a feather edge formed by continuing the slot 2 as a groove 3 in the inner wall of the ring A. The groove 3 extends from the outer wall of the ring to the inner wall thereof with the ends of said groove merging into the slot 2 and the inner wall of the ring, as best shown in Fig. 2. The grooves 3 are cut on a radius of less length than the radius of the ring A, therefore the grooves 3 have a greater arcuation than any portion of the ring, the purpose of which will hereinafter appear.

The outer walls of the ring ends B and C are cut away to provide transverse shoulders 4 intermediate the ends of the slots 2, and by cutting away the ends of said ring, there are formed arms 5 at the sides of the slots, said arms constituting supporting members for an intermediate connecting member, as will hereinafter appear.

The connecting member adapted to be interposed between the split ends of the ring comprises a plate 6 having a central longitudinal rib or web 7 and this plate is of such an area that it may bear on the arms 5 and contact with the shoulders 4 when the ring is retracted, said plate, together with the arms 5, corresponding in cross sectional area to that of the ring. The plate 6 is adapted to ride on the arms 5 with the rib 7 extending in the slots 2 and the grooves 3, and said rib has arcuated edges 8 corresponding to the arched walls of the grooves 3, while the inner edge of the rib 7 is described on the same radius as that of the ring A, so that the inner edge of the rib 7 may represent a continuation of the inner wall of said ring, while the plate 6 represents a continuation of the outer wall of said ring.

With the member interposed between the split ends of the ring it is possible for said member to shift therebetween, and irrespective of the position of the ends of the ring relative to each other, the plate 6 seals the joint and there can be no leakage during the operation of a piston in a cylinder.

One embodiment of our invention has been illustrated, but it is to be understood that the structural elements are susceptible to such changes as fall within the scope of the appended claim.

What we claim is:—

A piston ring having split ends divided on a bias, and longitudinally slotted, said ring at its split ends having its inner walls grooved with one end of each groove merging at the outer wall of the ring, and the opposite end of the groove merging into the inner wall of the ring, the ends of said ring being cut away to provide transverse shoulders and supporting arms at the sides of the slot of said ring, and a connecting member interposed between the split ends of said ring and having a plate forming part of the outer wall of the ring and adapted to ride on the arms of said ring and abut the shoulders thereof, said plate having a rib extending under said plate and outwardly from the ends of said plate into slots and grooves of said ring with the outer edge of said rib arcuated from said plate to the ends of the rib so as to conform to the walls of said groove and the inner edge of said rib representing a continuation of the wall of said ring.

In testimony whereof we affix our signatures in presence of two witnesses.

JOSEPH A. BERELS.
RAYMOND T. CRIST.

Witnesses:
KARL H. BUTLER,
ANNA M. DORR.